United States Patent
Kruse et al.

(10) Patent No.: US 11,223,246 B2
(45) Date of Patent: Jan. 11, 2022

(54) STATOR

(71) Applicant: Wittenstein SE, Igersheim (DE)

(72) Inventors: Ing. Ralf Kruse, Würzburg (DE); Wolfgang Weigel, Igersheim (DE); Ingolf Gröning, Bad Mergentheim (DE); Armin Neubert, Niederstetten (DE); Sandra Köhler, Wittighausen (DE)

(73) Assignee: Wittenstein SE, Igersheim (DE)

( * ) Notice: Subject to any disclaimer, the term of this patent is extended or adjusted under 35 U.S.C. 154(b) by 0 days.

(21) Appl. No.: 16/996,129

(22) Filed: Aug. 18, 2020

(65) Prior Publication Data
US 2021/0057943 A1    Feb. 25, 2021

(30) Foreign Application Priority Data
Aug. 19, 2019 (DE) ...................... 10 2019 122 239.7

(51) Int. Cl.
| H02K 1/16 | (2006.01) |
| H02K 15/02 | (2006.01) |
| H02K 3/48 | (2006.01) |

(52) U.S. Cl.
CPC ............... *H02K 1/165* (2013.01); *H02K 3/48* (2013.01); *H02K 15/024* (2013.01)

(58) Field of Classification Search
CPC ............. H02K 1/16; H02K 15/02; H02K 3/38
USPC ....... 310/154.12, 216.004, 216.011, 216.016
See application file for complete search history.

(56) References Cited

U.S. PATENT DOCUMENTS

| 4,613,780 | A  | * | 9/1986 | Fritzsche | H02K 1/16 310/216.043 |
| 6,483,221 | B1 | * | 11/2002 | Pawellek | H02K 1/148 310/216.064 |
| 6,836,051 | B2 | * | 12/2004 | Hiwaki | H02K 1/185 310/254.1 |
| 7,164,218 | B2 | * | 1/2007 | Kimura | F04C 23/008 310/216.044 |
| 7,583,003 | B2 | * | 9/2009 | Miyashita | H02K 1/148 310/194 |
| 2001/0030486 | A1 | * | 10/2001 | Pijanowski | H02K 3/522 310/254.1 |
| 2003/0098628 | A1 | * | 5/2003 | Enomoto | H02K 15/022 310/216.057 |
| 2004/0189136 | A1 | * | 9/2004 | Kolomeitsev | H02K 3/345 310/216.082 |
| 2005/0116575 | A1 | * | 6/2005 | Zepp | H02K 1/148 310/216.102 |
| 2010/0192357 | A1 |   | 8/2010 | Mitsui et al. | |

(Continued)

*Primary Examiner* — Jose A Gonzalez Quinones
(74) *Attorney, Agent, or Firm* — Bachman and Lapointe PC; George Coury

(57) ABSTRACT

A stator (300) for an electric machine, having a yoke ring (310), and a plurality of teeth (220) arranged side by side within the yoke ring (310) in the circumferential direction, wherein each tooth (220) has a yoke portion (222), wherein the yoke portions (222) of the teeth (220) support one another in the circumferential direction, wherein respectively at least a part of the outer circumference of the yoke portion (222) of each tooth (220) deviates from a circle segment shape that is concentric to a central axis (302) of the stator (300), and the outer circumference encloses at each point an angle of more than 45° with the radius (304) defined by the central axis (302).

14 Claims, 5 Drawing Sheets

(56) References Cited

U.S. PATENT DOCUMENTS

| | | | |
|---|---|---|---|
| 2011/0285138 A1* | 11/2011 | Asanuma | H02K 1/148 290/55 |
| 2016/0181876 A1* | 6/2016 | Kawasaki | H02K 3/28 180/444 |
| 2019/0115794 A1* | 4/2019 | Liang | H02K 15/024 |

* cited by examiner

STATOR

BACKGROUND OF THE INVENTION

The invention relates to a stator for an electric machine and a method for producing a stator. The invention in particular relates to an electric machine having a stator and a rotor.

From the state of the art, stators for electric machines such as, for instance, electric motors or electric generators are known, see application document US2010/0192357, for example.

Stators may be built up, for example, from a laminated stator sheet package with a substantially circular ring, the so-called yoke, from which webs, which form teeth, are directed inward. Between these teeth are free spaces, so-called grooves, into which the stator windings are introduced.

In stators according to the state of the art, the windings often must be laid around the teeth from the inside between the lateral ends of the teeth tips. On the one hand, this is quite complex, on the other hand it is difficult to achieve a high degree of filling in the winding spaces (grooves), which might require a larger structural form of the motors. This may furthermore also entail higher costs of a motor.

Moreover, the magnetic flux between the yoke ring and teeth is possibly not optimal in stators according to the state of the art so that the performance of an electric machine having such a stator may be restricted.

SUMMARY OF THE INVENTION

It is a task of the invention to solve the problems of the state of the art at least in part. In particular, it is a task of the invention to provide an improved stator. It is furthermore a task of the invention to provide a stator having increased torque, in particular having increased continuous torque. Furthermore, it is a task of the invention to provide a stator by means of which an improved and/or cost-efficient tooth winding process may be performed.

The task is solved by a stator as disclosed herein, an electric machine having a stator as disclosed herein, and a method for producing a stator as disclosed herein. Advantageous further developments and embodiments will result from the dependent claims and from this specification.

One aspect of the invention relates to a stator for an electric machine having a yoke ring, a plurality of teeth arranged side by side within the yoke ring in the circumferential direction, wherein each tooth has a yoke portion, wherein the yoke portions of the teeth support one another in the circumferential direction, wherein at least a part of the outer circumference of the yoke portion of each tooth deviates from a circle segment shape that is concentric to the central axis of the stator, and the outer circumference encloses at each point an angle of more than 45° with the radius defined by the central axis.

A further aspect relates to an electric machine having a stator in one of the typical embodiments described herein, and a rotor arranged within the stator and being concentric to the stator.

A further aspect relates to a method for producing a stator in one of the typical embodiments described herein for an electric machine. Typically, the production method comprises: arranging a plurality of teeth side by side along a circumferential direction, wherein each tooth has a yoke portion; joining a yoke ring to the arranged plurality of teeth so that the yoke portions of the teeth support one another in the circumferential direction, wherein the yoke ring is made of a ferromagnetic material permeated by an electric insulator for suppressing eddy currents. Typically, the yoke ring is punched as a compound die. A part of the outer circumference of the yoke portion of a tooth typically is a straight or curved portion of the outer circumference of a tooth.

Typically, by the term "outer circumference" that part of the yoke portion is designated which delimits the tooth towards radially outside, or that part which is adjacent to the yoke ring. In typical embodiments, these definitions designate the identical part of the tooth yoke portion.

Typically, the angle arises as a cutting angle between the tangent to the outer circumference at one point, and by a straight line generated by the radius through the central axis of the stator.

Typically, the angle enclosed by the outer circumference at one point and the radius through the central axis of the stator designates the smaller of the two angles. As far as angles are considered herein, "radius" typically designates a straight line which, for the angle determination, reaches beyond the outer circumference. Typically, the angle is defined by the outer circumference at one point and the radius through that point. Typically, the angle is related to the angle enclosed by the tangent of the outer circumference at this point and the radius at this point. Typically, the angle at each point of the outer circumference of the yoke portion of the tooth is at least 45°, at least 50°, at least 55° or at least 60° or a maximum of 90°. An advantage of such flat angles may be that the occurrence of undesired or unplanned constraining forces is avoided, or undesired or unplanned constraining forces are at least reduced. Such flat angles may also assist in avoiding or reducing mechanical repetition. The mentioned angle of at least 45° may be considered identical to the following definition: the tangent of the outer circumference runs at least as much in the circumferential direction as in the radial direction, typically more in the circumferential direction than in the radial direction.

In the present disclosure, the yoke portions of the teeth support one another in the circumferential direction. In embodiments of the present disclosure, the yoke portions of the teeth can support one another directly. For example, when being directly supported, the yoke portion of a tooth is in direct contact with an adjacent yoke portion of a respectively adjacent tooth. The boundary surface between two teeth may in this case be planar, in particular a plane oriented in the radial direction, or be realized to be deviating from a plane, for example in the form of a tongue-and-groove arrangement or having a wedge shape.

According to the present disclosure, the yoke ring is made of a ferromagnetic material. For suppressing eddy currents, the ferromagnetic material of the yoke ring is typically permeated by an electric insulator. The yoke ring may be composed, for example, at least to 90% of a ferromagnetic material permeated by insulating material. According to one embodiment, the yoke ring can have a material interrupted by an insulating material.

According to embodiments described herein, the yoke ring may be pressed or shrunk onto the entirety of the teeth. The plurality of the teeth is thereby compressed radially to the inside by the yoke ring. Due to the arrangement of the yoke portions described herein, the teeth support one another in the circumferential direction. The arrangement of the yoke portions can be understood illustratively as a self-supporting arch of a building, for example, a round arch.

In further embodiments, adjacent yoke portions may support one another at least indirectly. An indirect support of the yoke portions may be realized as a connecting element, for example, which connects one yoke portion, in particular all of the yoke portions, to a respectively adjacent yoke portion.

In embodiments of the present disclosure, the ferromagnetic material of the yoke ring may be an SMC. In this case, SMC designates a material of a so-called "Soft Magnetic Composite". SMC typically may be a material of soft magnetic composite materials of powder, wherein single particles of the material have an electrically insulating coating. The material of the SMC may comprise iron or iron alloy, for example. The material of the SMC may have an iron content of about 70% or more, about 75% or more, about 80% or more, or about 85% or more, for example. In further embodiments, the plurality of teeth may be made of an SMC.

In preferred embodiments, the yoke ring is made of a laminated material or of a laminated sheet package. In further preferred embodiments, also the plurality of teeth may be made of a laminated material or of a laminated sheet package. Laminated sheet package or laminated realization means a realization in which partial laminated sheet packages are composed of single thin sheets of metal, which can also be called lamellae. Here, a component manufactured from single sheets of metal is understood as a partial laminated sheet package, wherein the component is a sub-component of the stator. The single lamellae of a partial laminated sheet package usually lie axially on top of each other and are typically electrically insulated from each other by a thin insulation layer so as to suppress eddy currents within the laminated sheet package.

A laminated sheet package, for example, may be built up of a plurality of single laminated sheet packages or a plurality of single sheets of metal. The yoke ring, for example, may be manufactured from a plurality of one-piece metal sheet rings. The sheet thickness of the single lamella typically is about 0.1 mm to about 1 mm. When the stator, for example, has an axial laminated sheet package length of 40 mm, each partial package, depending on the sheet metal thickness, is typically composed of 400 to 40 single lamellae. In embodiments, the laminated sheet package outer diameter of the yoke ring may be 100 mm to 200 mm, for example. The laminated sheet package is typically inherently form-fit and force-fit.

As a joining technique between the single lamellae of the partial laminated sheet packages, the Backlack technique may be used, for example, in which adjacent single lamellae are glued together substantially over the complete surface. In general, other joining techniques are also conceivable, e.g. punch-packing or welding. The Backlack technique may in particular have the advantage that the joining process of the partial packages is assisted since each partial package itself can have high rigidity and at the same time high shape accuracy.

According to embodiments described herein, the winding upon the respective teeth from the plurality of teeth may be performed by a coil extending around the respective tooth prior to joining by the yoke ring. Thereby, a partial or complete automation of the winding process may be achieved. In particular, a direct winding upon the teeth may thereby be enabled.

The term "direct winding" herein describes a winding in which the winding wire is directly wound around the tooth. In case of a non-direct winding, for example, the coil is first wound on a device and shifted upon the tooth after the winding on the device is completed.

A direct winding may further result in a higher copper filling factor, whereby the continuous torque of the electric machine can be increased. In embodiments, the continuous torque may be increased by at least 30%, for example.

In typical embodiments, the method may comprise at least one of pressing or shrinking the yoke ring upon the plurality of the arranged teeth, casting and/or impregnating.

According to embodiments described herein, each tooth has a radially inner tooth tip. Typically, adjacent tooth tips do not touch one another. The tooth tips may in particular be separated by groove slots or so-called tooth tip gaps.

In typical embodiments, the outer circumference of at least a part of the yoke portions of the teeth is deviating from a circle segment shape that is concentric to the central axis of the stator. In particular, the outer circumference or a part of the outer circumference of at least one tooth may deviate such that the at least one tooth is centered in the yoke ring in the circumferential direction. In embodiments, the outer circumference of each tooth of the stator may deviate from a circle segment shape. In typical embodiments, all of the teeth or at least 90% of the teeth are formed to be identical or at least substantially identical. Typically, the geometry of the yoke portions and the yoke ring are selected, for example, in an embodiment having partial laminated sheet packages, such that a favorable distribution of the mechanical tensions may be achieved in the entire laminated sheet package. An elliptical deformation of the stator or the yoke ring can be avoided.

According to embodiments described herein, at least a part, in particular a substantial part of the yoke portions may have an in particular outward directed wedge shape in cross section. In embodiments, a wedge shape having an obtuse angle of larger than 90° and smaller than 180° or smaller than 150° is possible. The cross section here refers to a cross-sectional plane perpendicular to the central axis of the stator. In embodiments, all of the yoke portions may have an in particular outward directed wedge shape. In embodiments, at least a part of the yoke portions may have at least a radially inward directed wedge shape, or in addition or instead a radially outward directed wedge shape in cross section.

Typically, the yoke portions of the teeth have a continuous increase of the radial cross section from the outer edges of the yoke portions to the centers of the yoke portions in the circumferential direction. At the outer edges, the yoke portions, in particular of different or adjacent teeth, abut directly or indirectly in typical embodiments. In this manner, the yoke portion may have an outward directed wedge shape, for example, also with a kink of the outer circumference on both sides of the center. Typical yoke portions or typical teeth are constructed to be symmetrical to a radially oriented center line. Typical yoke portions have an outer circumference which is formed to be symmetrical to a radially oriented center line of the tooth or the yoke portion.

In embodiments of the present disclosure, a form closure is present in the circumferential direction in particular between at least a part of the teeth, in particular the respective yoke portions of the teeth, and the yoke ring.

In typical embodiments, the yoke ring can be shrunk or pressed upon the teeth. This allows a close form closure between the yoke ring and the teeth or between the yoke ring and the respective yoke portions of the teeth to be achieved. The magnetic flux guidance may thus be improved.

In embodiments, the inner side of the yoke ring may deviate from a circular shape. In embodiments having outward directed wedge shapes of the yoke portions, the inner side of the yoke ring may have a recess that is complementary to the wedge shape. This allows the accuracy of the position of the teeth to be improved in the circumferential direction. Typically, the inner side of the yoke ring in the portion of a tooth has a shape that is complementary to the outer circumference of the yoke portion of the tooth.

The outer circumferences of typical exemplary embodiments may serve the purpose of circumferentially centering each tooth in the yoke ring. This allows the torque transmission between teeth and yoke ring caused by the form closure to be secured or improved even in case of low surface pressure. Due to typical outer circumferences of the yoke portions of the teeth, the yoke ring generates normal forces obliquely relative to a radial direction, while the yoke ring itself may have a high width and stability between the teeth, i.e. in the angle area of the grooves situated between the teeth.

In embodiments of the present disclosure, each tooth typically has a coil extending around the respective tooth, such as a copper coil, for example.

Typically, in the radial cross section, the yoke ring at the edges of the outer circumference of each tooth, is at least 1.3 times, at least 1.5 times, more than 1.5 times, at least 2.5 times or at least 3.5 times or at maximum 5 times or at maximum 3.5 times as thick in the radial direction as the yoke portion of the tooth at the same point in the circumferential direction. In typical embodiments, the yoke ring is in the radial cross section in the center of the respective outer circumference of each tooth at least 0.5 times or at least 0.7 times or at most 1.5 times or at most 1.3 times as thick as the yoke portion at the same point in the circumferential direction.

These dimensions each are advantageous for the shape accuracy of the stator, in particular when the yoke ring and the teeth are laminated. Moreover, high magnetic flux guidance can be achieved, during which magnetic asymmetries are avoided.

In embodiments, the radial extension of the yoke ring and yoke portions at the edge of a yoke portion may have a ratio of at maximum 6:1 and/or at minimum 2:3. For example, at the joint between two adjacent teeth or yoke portions, a ratio of the yoke ring to yoke portions may be at maximum 4:1 and/or at minimum 3:2. This allows high magnetic flux guidance to be achieved.

Typically, the outer circumference of the yoke portion of a tooth respectively comprises at least two straight portions. Typical embodiments having straight portions may be punched at higher process safety than having curved portions.

Typically, the outer circumference of the yoke portion of a tooth is respectively made up from not more than ten straight portions or comprises not more than ten straight portions. In addition to the straight portions, at least one or exactly one curved, in particular outward curved portion, also referred to as a fillet, may further be present in embodiments, or exclusively straight portions may be present in embodiments.

In typical embodiments, a fillet is provided at the wedge shape or between respectively the middle sections of an outer circumference of a tooth. Typically, the fillet points radially outward, and thus is curved to the outside as seen from the tooth. Typically, between the straight portions joining the fillet and the fillet there is no kink. In further embodiments, a kink is provided at the transition from the straight portion to the fillet.

In typical stators of exemplary embodiments, the outer circumference of the yoke portion of a tooth comprises respectively at least or exactly four straight portions.

At the respective center of the outermost portions, the outer circumference typically encloses respectively an angle of at least 70°, more than 75°, more than 80°, or more than 83°, and at most 85°, and/or less than 90° with the radius defined by the central axis. The outermost portions are respectively the straight portions starting at the edges on both sides of the yoke portion. The center of a portion respectively designates the center of the straight line of this straight portion. The angle, if possible, is the smaller angle enclosed by the straight line of the straight portion, and the radius running through the central axis and the center of the portion. The central straight portions are the portions each lying closest to the center of the outer circumference of the yoke portion of a tooth and are each adjacent to a centrally arranged fillet or abutting directly in the center. Typically, the outermost straight portions are only slightly inclined or less inclined than the central portion relative to the circumferential direction. In this way, a stabilization of the position of the tooth in the yoke ring may be achievable.

At the respective center of the central portions, the outer circumference typically encloses respectively an angle of at least 45°, at least 55°, at least 60°, or at most 75° with the radius defined by the central axis. Hence, the central portions are typically steeper relative to the circumferential direction than the outer portions. In case of more than two portions on both sides of the center, the slope of the straight portions with respect to the circumferential direction typically increases toward the center.

Advantages of typical embodiments may comprise: more material at the yoke ring, in particular in embodiments having four straight portions of the outer circumference, a statically determined accommodation of the teeth in the yoke ring, a greater length of the outer circumference so that the magnetic flux can be improved, as well as mutual interlocking of the yoke ring and the yoke portions.

BRIEF DESCRIPTION OF THE DRAWINGS

Subsequently, the present invention will be explained in more detail on the basis of the appended drawings, wherein the figures are described as follows.

DETAILED DESCRIPTION

Figure 1:
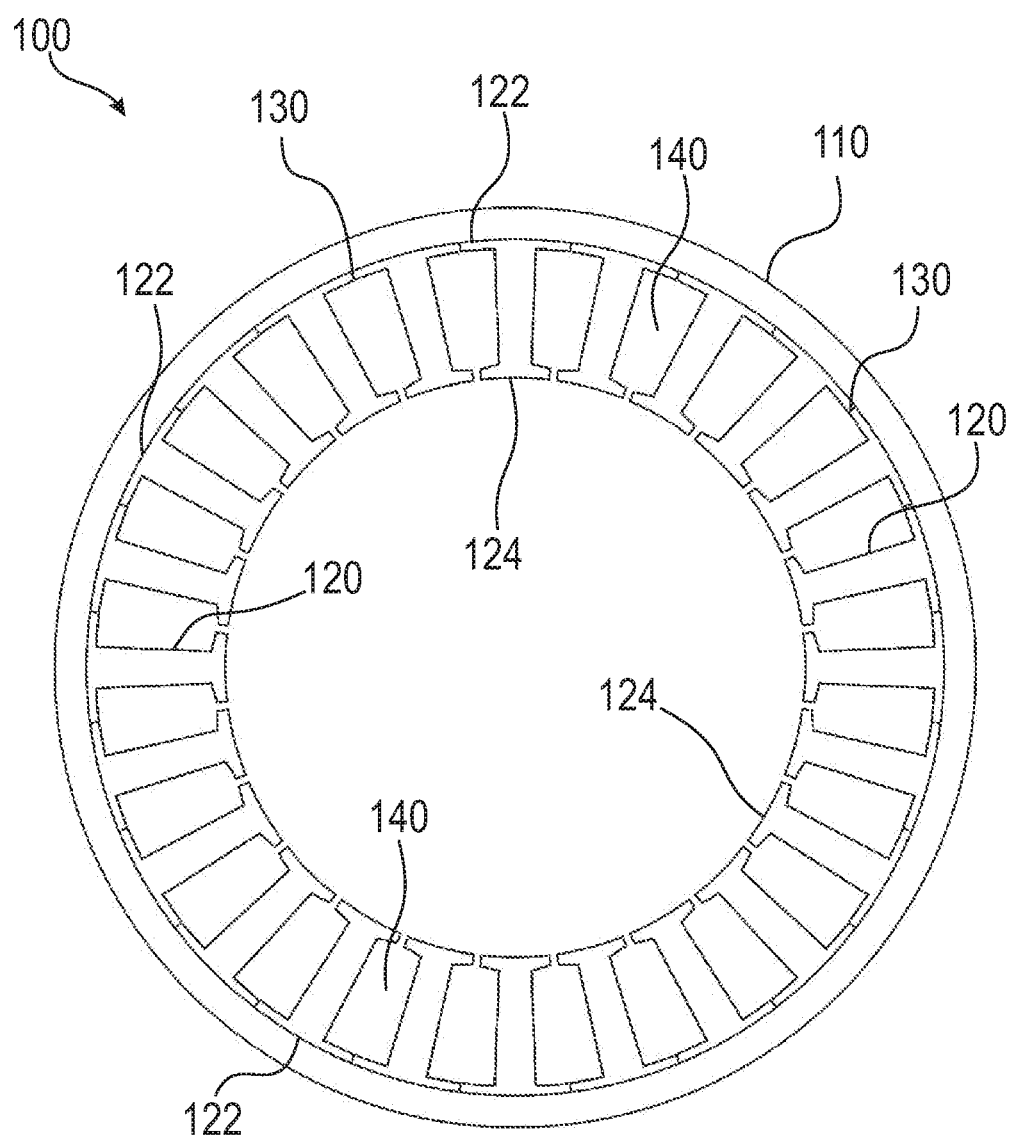
FIG. 1 is a schematic cross-sectional view of a stator.

Subsequently, typical embodiments will be described on the basis of the figures, with the invention being not restricted to the exemplary embodiments of FIGS. 2 to 5, the scope of the invention rather being determined by the claims. In the description of the embodiment, identical reference numerals for identical or similar parts are possibly used in various figures or for various embodiments in order to make the description clearer. This, however, does not mean that the corresponding parts of the invention are restricted to the variants illustrated in the embodiments.

FIG. 1 shows a stator 100. The stator 100 of FIG. 1 does not correspond to an embodiment of the invention but has features which may be expedient for explaining exemplary embodiments. The stator 100 has a plurality of teeth 120 arranged side by side in the circumferential direction within a yoke ring 110. Each tooth of the plurality of teeth 120 has a yoke portion 122.

The yoke ring 110 of the stator 100 is made of a ferromagnetic material permeated by an electric insulator for suppressing eddy currents.

In FIG. 1, the stator 100 is illustrated by way of example as a lamination of a stator realized as a laminated sheet package. The features shown in FIG. 1 can be transferred to a stator described herein which is made of an SMC. In a stator realized as a laminated sheet package, the yoke ring 110 has a plurality of metal sheets which are mutually electrically insulated. In FIG. 1, the teeth 120 are illustrated as a lamination. The single metal sheets of the teeth realized as a laminated sheet package are mutually electrically insulated. The single metal sheets of the yoke ring and/or the teeth may be coated, for example, with an insulating varnish or a thermosetting varnish. A single tooth realized as a laminated sheet package as well will be referred to as a tooth package hereinafter. As shown in FIG. 1, the yoke portions 122 of the teeth support one other in the circumferential direction.

Reference numeral 130 marks the transition between the individual teeth. Hereinafter, this will be designated as "transition 130" for reasons of simplicity.

As shown in FIG. 1, the teeth 120 have radially inner tooth tips 124. At the end of the respective tooth 120, which end is situated radially inside, the respective tooth tip 124 represents an end portion widening toward the tooth center in the circumferential direction.

Reference numeral 140 marks an area in the stator 100 which, in the case of teeth 120 wound with coils, is filled with the corresponding coil material. Hereinafter, this will be designated "groove 140" for reasons of simplicity.

Figure 2A:
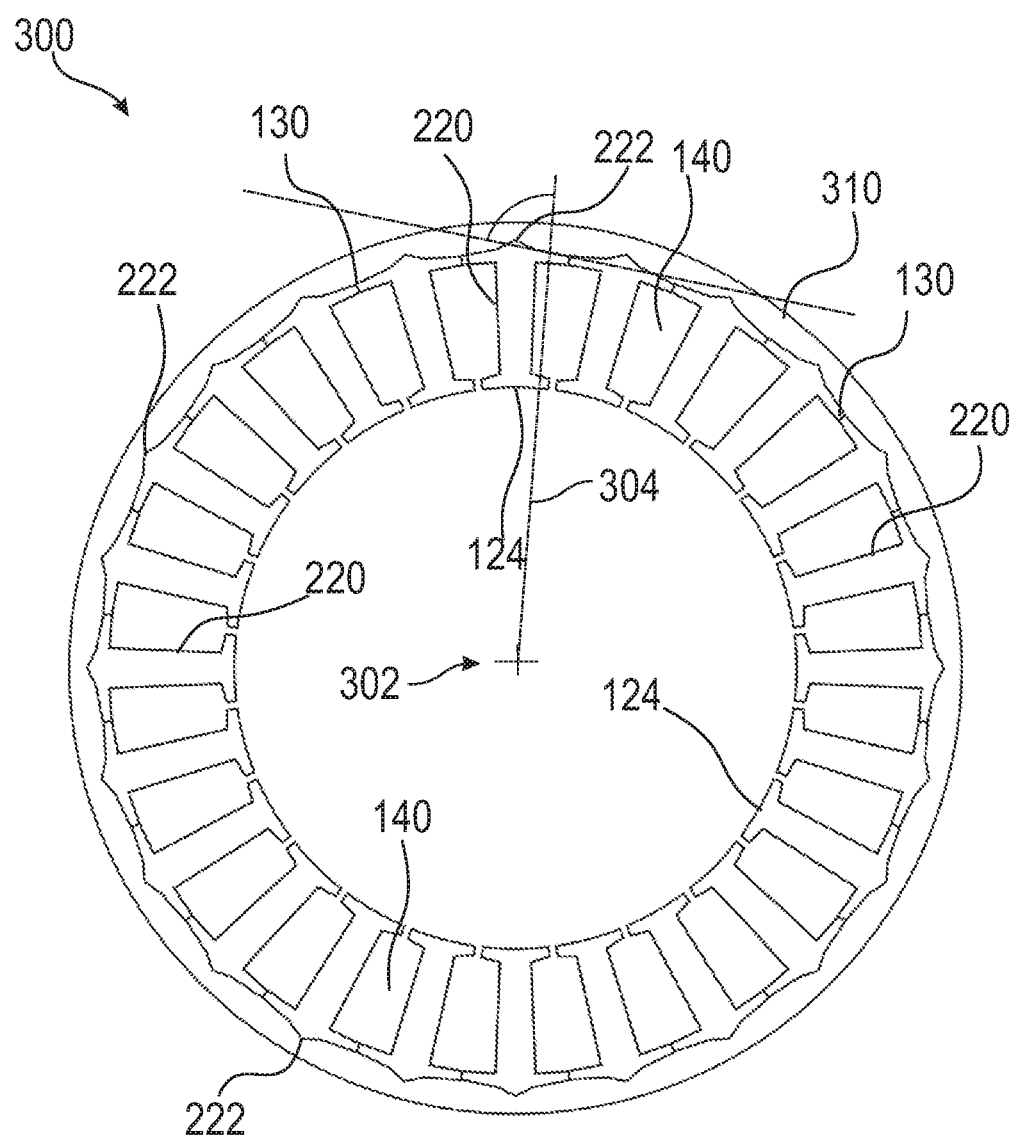
FIG. 2A is a schematic cross-sectional view of a stator according to one embodiment.

FIG. 2A shows an exemplary embodiment according to the invention of a stator 300. Some components from FIG. 1A are further used for reasons of simplicity, wherein novel technical contexts can be the result.

In the stator 300 shown in FIG. 2A, teeth 220 of the stator each have a wedge-shaped yoke portion 222. This means that the ring formed by the yoke portions of the teeth arranged side by side in the circumferential direction deviates from a circular shape in the teeth 220. Correspondingly, the radially outer surface of the wedge-shaped yoke portion 222 deviates from a circle segment shape. The wedge-shaped yoke portion 222 tapers radially toward the outside. In the outer areas situated in the circumferential direction, the slope of the wedge shape of the wedge-shaped yoke portion 222 flattens. The teeth 220 are accommodated in a yoke ring 310 with the yoke portion 222 in a statically determined manner.

In further embodiments, the yoke portion of a tooth may be realized to be dovetail-like, wedge-shaped with a rounded wedge tip directed toward the inside or the outside, or shaped as a segment of a circle. The statically determined mounting of the teeth by the yoke portion and the yoke ring may avoid constraining forces.

The yoke ring 310 is realized with recesses which are complementary to the wedge-shaped yoke portions 222. That means the yoke ring 310 deviates at its radial inner surface respectively from a circular shape at the point provided for positioning the wedge-shaped yoke portion 222. The normal forces generated by the yoke ring 310 are pressing obliquely relative to a radial direction due to the outer wedge tip of the wedge-shaped yoke portion 222. Centering of the tooth 220 within the yoke ring 310 can thus to be achieved.

In the wedge-shaped yoke portion 222 shown in FIG. 2A, the magnetic flux of a tooth has a large transition surface to the yoke portions of the adjacent teeth and to the yoke ring 310. Due to the large transition surface, for example, production-related parasitic gaps between a tooth package and the adjacent partial packages, in particular the yoke ring, magnetically only have a slight effect. Typically, the gaps only occur at a part of the radial outer surface of the yoke portion or the radial inner surface of the yoke ring so that the magnetic flux can evade to gap-free areas.

The radially inner end portion of the respective tooth tip 124 may extend in a T-shape in cross section, for example. The tooth tip 124 may in particular have a radial inner surface that is formed to be concave. The tooth tips 124 in FIG. 2A form in cross section a radially inner, non-closed ring which is interrupted by air gaps, the so-called groove slots. Groove slots are present in typical embodiments of the invention. Without groove slots, the result may be a magnetic short circuit of the stator or rotor, whereby the torque is being reduced.

An advantage of the present disclosure is that in the area of the transition 130 only a small part of the yoke or of the yoke portions arranged side by side is divided. Thereby, parasitic gaps have only limited effects on the magnetic flux flowing in the circumferential direction. In the area of the teeth, the yoke flux can evade into the corresponding tooth package over a large area, when parasitic gaps are given.

This allows in particular the magnetic field in the air gap between the stator and a rotor not illustrated in FIG. 2, which is decisive for the operational behavior, to be substantially unaffected by the parasitic gaps. The embodiments described herein can in particular have low torque fluctuation in stationary operation and/or low magnetic noise generation.

The tooth tip of a tooth 220 typically is designed such that a coil wrapped around the tooth (tooth coil) is supported radially inside by the tooth tip. In embodiments, the coil is supported radially outside by the interior side of the yoke portion of the respective tooth. This allows a high copper filling to be achieved in the groove 140, and a free space within the groove 140 may be partially or almost avoided. Furthermore, a high torque may be generated by the higher copper filling. A high copper filling may furthermore enable a minimized structural size of an electric machine equipped with the stator.

In FIG. 2A, the rotation axis or central axis 302 of the stator 300 is moreover shown.

Insofar as the radius or circumferential direction are described in this application, these terms generally refer to the central axis of the stator.

In the embodiments described herein having an outer surface of a yoke portion deviating from a circle segment shape that is concentric to the central axis of the stator, such as, for example, an outer surface having a wedge shape, high mechanical stability at good shape accuracy, in particular a good circumferential centering of each individual tooth can be achieved.

Favorable surface pressing forces may in particular be achieved in the yoke portion. Furthermore, the stator may have a high total rigidity since the yoke ring 310 is particularly wide in the area of the transitions 130.

A circle segment shape deviating in the direction of the central axis of the stator, for example, may also be a circle segment shape of which the center point of the circle segment is radially outside the central axis of the stator in cross section.

As illustrated in FIG. 2A, the stator 300, between the yoke ring 310 and the wedge-shaped yoke portions 222, has a correspondingly large transition surface for the magnetic flux. The minimization of magnetic bottlenecks allows a guidance of the magnetic flux to be achieved that is as optimal as possible. Thereby, the risk of parasitic magnetic interruptions occurring between the tooth packages among one another and in the direction of the yoke ring can be reduced, which in the stator might result in an increased cogging torque, increased torque ripple and increased electromagnetic noise development.

Figure 2B:
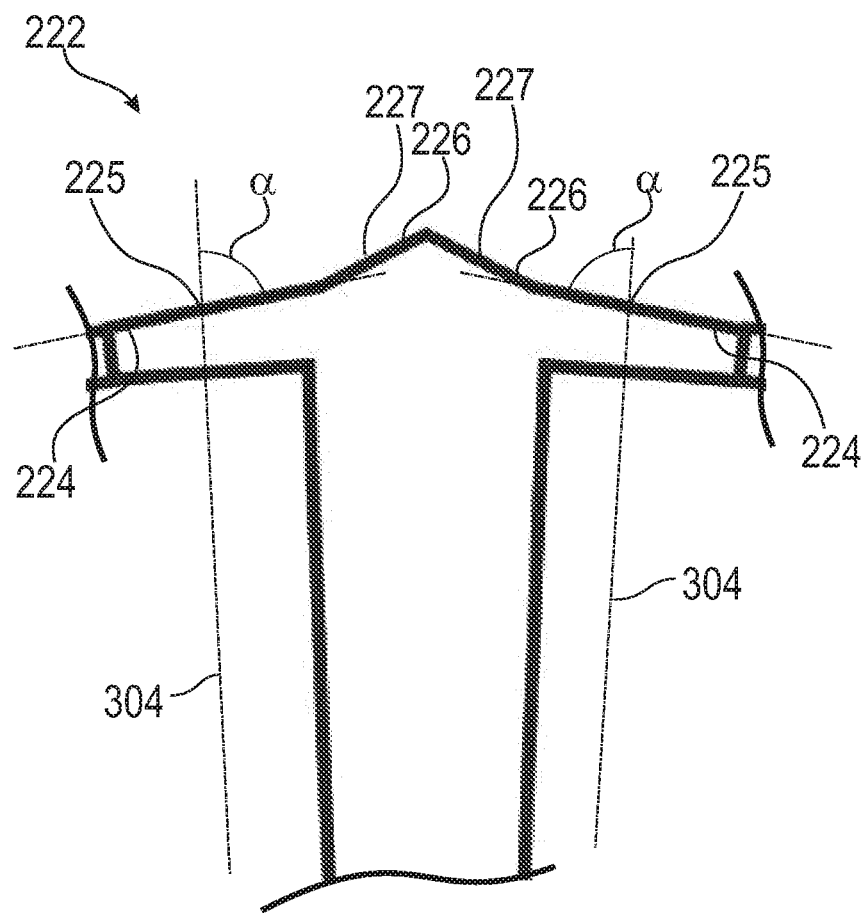
FIG. 2B is a schematic view of a detail of the embodiment shown in FIG. 2A.

In FIG. 2B, a detail of the embodiment from FIG. 2A is explained more precisely. In conjunction with FIG. 2B, reference numerals of FIG. 2A will be explained as well. The yoke portion 222 has four straight portions 224, 226 divided into two outer portions or outermost portions 224 and two inner portions or central portions 226. The outermost portions 224 each are situated outside and the central portions 266 each are situated inside the yoke portion 222.

In all portions, the centers 225 and 227 are marked in each case. At the outer centers 225, the circumference of the yoke portion or the outer portions 224, for example, encloses or enclose respectively an angle of $\alpha=85°$ with the radius of the stator 300 relative to the central axis 302 of the stator 300 through the center 225. For the center 225 illustrated left in FIG. 2B, the associated radius 304 is plotted by way of example, which runs through the central axis 302 of the stator 300 (in each case not shown in FIG. 2B). The radius 304 through the center 225 of the left outer portion 224 encloses an angle of $\alpha=85°$ with the straight line of the outer portion 224, which angle is shown in the drawing of FIG. 2B. This applies analogously to the right outer portion 224, in which the radius 304 and the corresponding angle $\alpha$ are likewise plotted.

By way of example, the central portions 226 each enclose an angle of 65° at their centers 227 with the respective radii (not plotted for reasons of better clarity). The length of the outer circumference of the yoke portions that is increased as compared to the stator of FIG. 1, improves the magnetic flux, and the different angles are able to achieve a mutual interlocking of the yoke portions and the yoke ring.

In the straight portions, the direction of the outer circumference or the tangent to the outer circumference typically corresponds to the direction of the straight line.

According to the present disclosure, torque fluctuation can be kept low by the improved magnetic flux guidance in the stator, whereby an improved low noise level can be achieved as well.

In embodiments having a laminated yoke ring and/or laminated teeth, geometrically simple laminated sheet package components may be used, which are easy to manufacture, and whereby costs can also be reduced in addition.

Figure 3:
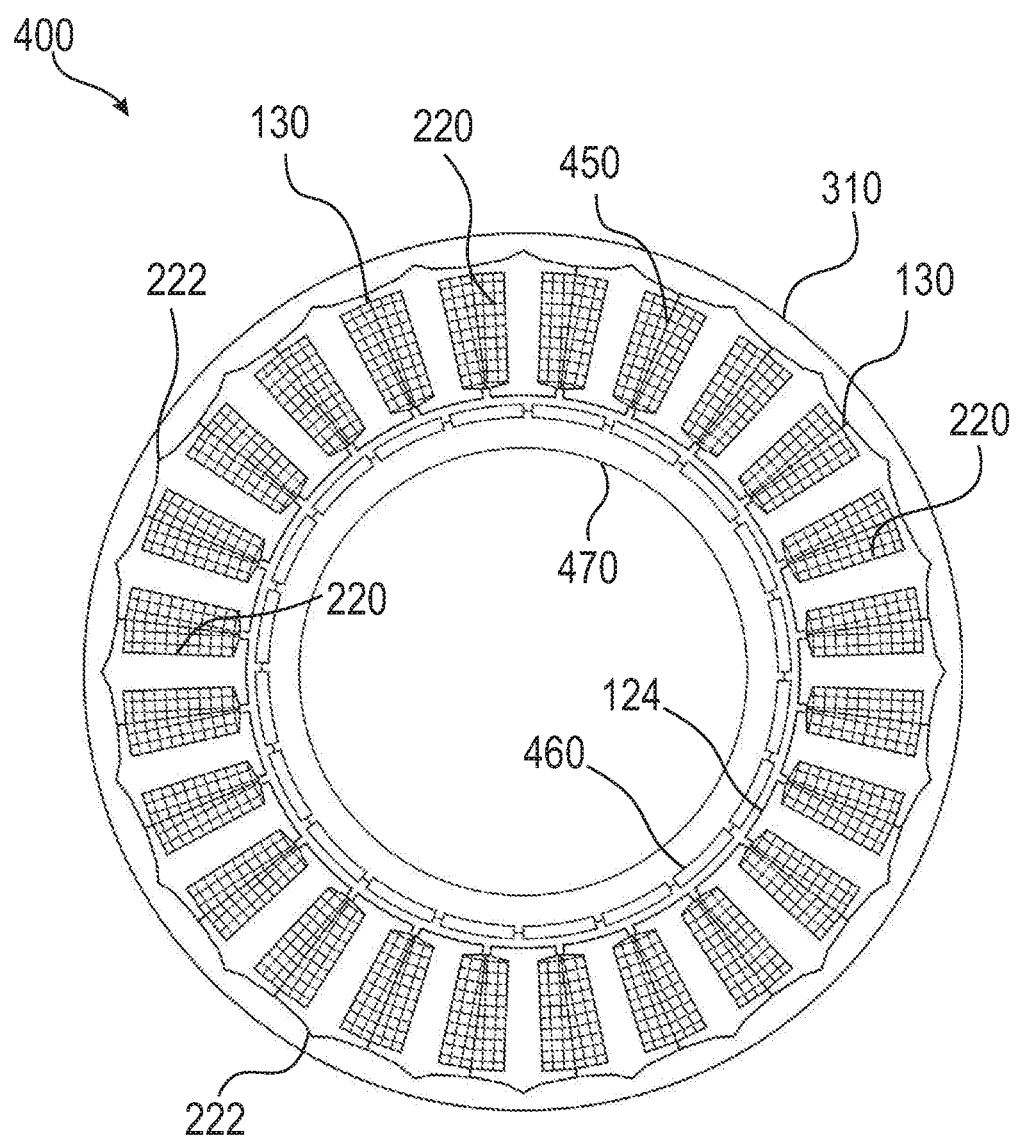
FIG. 3 is a schematic cross-sectional view of an electric machine according to one embodiment described herein.

FIG. 3 shows an electric machine 400 having a stator with a winding. A coil 450 fills in each case half of the respective adjacent groove or of the respective adjacent free space between two teeth. In FIG. 3, each tooth 220 is shown with a coil 450 extending around the respective tooth 220.

In embodiments, a direct winding may be applied to the teeth 220. The direct winding allows a layered, i.e. intersection-free coil winding of the tooth to be performed. As can be seen in FIG. 3, a free space in the groove is not or almost not required. This allows a high copper filling in the groove to be achieved together with a high torque.

A rotor 470 is arranged concentrically within the stator 300. In FIG. 3, the rotor 470 is realized as a permanent magnet rotor by way of example. Permanent magnets 460 magnetized in the radial direction are arranged along the outer circumference of the rotor 470 in the circumferential direction. The direction of the magnetic fields of the respective permanent magnets 460 alternates in the circumferential direction, i.e. a respective permanent magnet has a reversed polarization with respect to an adjacent permanent magnet.

In typical embodiments of the electric machine, a rotor according to known types of construction can be used. Apart from permanent magnet-excited rotors, electrically excited rotors may also be used, for example.

In preferred embodiments, the rotors are excited by permanent magnets and may have surface magnets or magnets embedded in the laminated sheet package of the rotor.

The electric machine 400 of the embodiment shown in FIG. 3 has a rotor 470 with 20 permanent magnets 460, i.e. 20 poles (10 pole pairs), and a stator 300 with 24 grooves 140. It is to be understood that each of the 24 teeth 220 can be wound with a coil 450. Correspondingly, each of the 24 tooth coils can fill half of the respective adjacent groove 140 with coil material such as copper, for example.

In embodiments of the invention, an arbitrary number of teeth, however, at least two teeth can be used. For embodiments having symmetrical three-strand windings, the number of teeth usually is a multiple of three.

In advantageous embodiments, the rotor can have 10 poles and the stator can have 12 teeth or a multiple of this combination, such as, for example, 20 poles and 24 teeth, or 30 poles and 36 teeth.

In embodiments having 30 poles and 36 teeth, the outer diameter of the yoke ring may be 200 mm, for example. The axial length of the yoke ring as well as of the teeth may be 30 mm to 200 mm in this embodiment, for example. In further embodiments, in particular in case of a yoke ring and/or teeth of a laminated material, the axial length of the yoke ring and/or of the teeth may be larger by a sheet metal thickness than the above-mentioned 30 mm to 200 mm.

In further embodiments, the rotor may have 8 poles, and the stator may have 9 teeth or a multiple of this combination, such as 16 poles and 18 teeth or 32 poles and 36 teeth, for example.

The production of a stator for an electric machine according to an advantageous embodiment may comprise the following production steps:

punching of the metal sheets of the individual teeth in the final geometry, and of the yoke ring in the final geometry, in particular as a compound die;

packaging the punched tooth and yoke ring sheets, for example, via Backlack packaging, into tooth packages or the yoke ring package;

insulating the teeth by applying a groove insulation to each tooth package;

directly winding a tooth coil, optionally as a coil chain, upon each individual tooth package;

arranging all of the wound tooth packages in a device for the purpose of a precise mutual positioning at the circumference;

pressing or shrinking the yoke ring upon the entirety of the wound tooth packages;

interconnecting the tooth coils or the coil chains to a complete, typically multiphase winding; and casting or impregnating the stator winding.

As an alternative to punching, water jet cutting, laser cutting or eroding may also be employed in step i).

Figure 4:
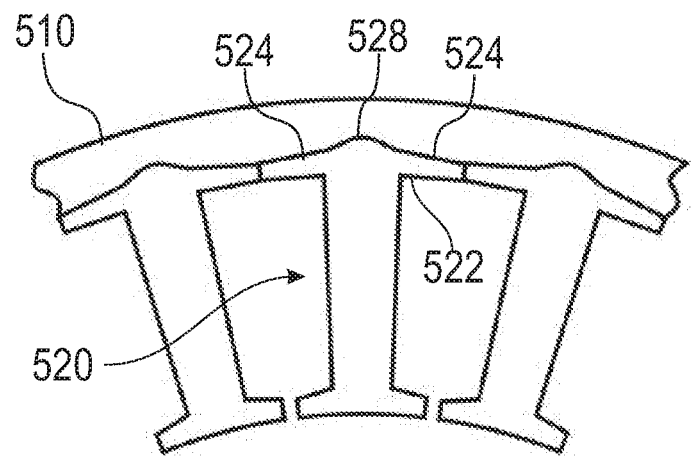
FIG. 4 is a schematic view of a detail of a further embodiment.

In FIG. 4, a detail of a further embodiment is shown, more specifically, three teeth 520 having a yoke portion 522 are shown. The remaining teeth of the complete stator are not shown in the embodiment of FIG. 4, but they are identical to the tooth 520.

The outer circumference of the yoke portion 522 of the exemplary embodiment of FIG. 4 has two straight portions 524 and a fillet 528 between the two straight portions 524. The yoke ring 510 (only illustrated in sections) is correspondingly shaped so that a gap between the outer circumference of the yoke portion and the yoke ring does not occur.

Instead of the two straight portions, more than in each case one straight portion may also be present on both sides of the fillet, for example, even differently inclined portions may be present, as is shown in FIG. 2B by way of example.

Figure 5:
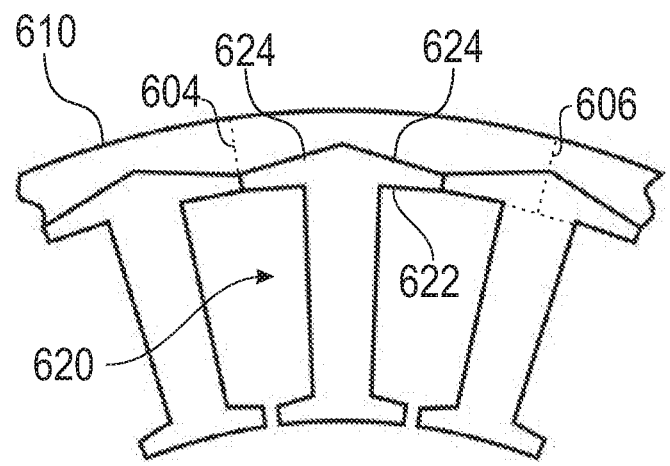
FIG. 5 is a schematic view of a detail of a further embodiment.

In FIG. 5, a detail of a further embodiment is shown, more specifically three teeth 620 having a yoke portion 622 are shown. The remaining teeth of the complete stator are not shown in the embodiment of FIG. 5, but they are identical to the tooth 620.

The outer circumference of the yoke portion 622 of the exemplary embodiment of FIG. 5 has exactly two straight portions 624 which are directly adjacent to one another. The yoke ring 610 (only illustrated in sections) is correspondingly shaped so that a gap between the outer circumference of the yoke portion and the yoke ring does not occur.

It is moreover shown in FIG. 5 that the yoke ring at the radial cross section 604 is more than 1.5 times as thick as the yoke portion at the radial cross section 604 at the edges of the outer circumference of the tooth, i.e. in the area of the transition between two yoke portions of two teeth. In the center 606 of the yoke portion 622, the ratio is about 1:1.

The invention is not restricted to the embodiments described above, rather the scope of the invention is determined by the appended claims.

The invention claimed is:

1. A stator for an electric machine, having
a yoke ring, and
a plurality of teeth arranged side by side within the yoke ring in the circumferential direction, wherein each tooth has a yoke portion,
wherein the yoke portions of the teeth support one another in the circumferential direction,
wherein respectively at least a part of the outer circumference of the yoke portion of each tooth deviates from a circle segment shape that is concentric to a central axis of the stator, and the outer circumference encloses at each point an angle of more than 45° with the radius defined by the central axis.

2. The stator according to claim 1, in which the outer circumference encloses at each point an angle of more than 60° with the radius defined by the central axis.

3. The stator (300; 400) according to claim 1, wherein the yoke ring is punched as a compound die and/or is made of a ferromagnetic material permeated by an electric insulator for suppressing eddy currents, and/or wherein the ferromagnetic material of the yoke ring is a laminated material or an SMC.

4. The stator according to claim 1, wherein each tooth has a radially inner tooth tip.

5. The stator according to claim 1, wherein at least a part of the yoke portions has at least one outward directed wedge shape in cross section.

6. The stator according to claim 1, wherein the yoke ring in the radial cross section at the edges of the outer circumference of each tooth is more than 1.5 times as thick in the radial direction as the yoke portion of the tooth at the same point in the circumferential direction.

7. The stator according to claim 1, wherein the outer circumference of the yoke portion of a tooth respectively comprises two straight portions.

8. The stator according to claim 7, wherein the outer circumference of the yoke portion of a tooth respectively comprises at least four straight portions, wherein the center of the outermost portions respectively encloses an angle of at least 70° and/or less than 90° with the radius defined by the central axis.

9. The stator according to claim 8, wherein the center of the central portions encloses an angle of at least 60° and/or at most 75° with the radius defined by the central axis.

10. The stator according to claim 5, wherein a fillet (528) is provided at the wedge shape and/or between the central portions (524).

11. The stator according to claim 1, in which a boundary surface between two teeth is planar, in particular a plane oriented in the radial direction.

12. The stator according to claim 1, wherein at least between a part of the teeth and the yoke ring, a form closure is present in the circumferential direction and/or wherein the yoke ring is shrunk or pressed upon the teeth.

13. The stator according to claim 1, wherein the yoke ring in the radial cross section in the center of the respective outer circumference respectively of one tooth is at least 0.5 times or at least 0.7 times or at most 1.5 times or at most 1.3 times as thick as the yoke portion at the same point in the circumferential direction.

14. An electric machine having a stator according to claim 1, and a rotor arranged within the stator and being concentric to the stator.

* * * * *